(12) United States Patent
Numidi et al.

(10) Patent No.: US 10,107,327 B2
(45) Date of Patent: Oct. 23, 2018

(54) CRANKSHAFT FOR AN INTERNAL COMBUSTION ENGINE

(71) Applicant: GM GLOBAL TECHNOLOGY OPERATIONS LLC, Detroit, MI (US)

(72) Inventors: Fabio Numidi, Aglie (IT); Giuliano Sperlinga, Ottaviano (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 50 days.

(21) Appl. No.: 15/285,902

(22) Filed: Oct. 5, 2016

(65) Prior Publication Data
US 2017/0097037 A1   Apr. 6, 2017

(30) Foreign Application Priority Data

Oct. 5, 2015   (GB) .................................... 1517520.1

(51) Int. Cl.
| | | |
|---|---|---|
| *F16C 3/08* | (2006.01) |
| *F02B 75/32* | (2006.01) |
| *F16C 3/06* | (2006.01) |
| *F16C 7/02* | (2006.01) |

(52) U.S. Cl.
CPC ................ *F16C 3/08* (2013.01); *F02B 75/32* (2013.01); *F16C 3/06* (2013.01); *F16C 7/023* (2013.01); *F16C 2220/46* (2013.01); *F16C 2360/22* (2013.01)

(58) Field of Classification Search
CPC ...... F16C 3/06; F16C 3/08; F16C 9/02; F16C 3/20; F16C 9/00; F16F 15/283; F16F 15/26; F02F 7/0053
See application file for complete search history.

(56) References Cited

U.S. PATENT DOCUMENTS

| | | | | |
|---|---|---|---|---|
| 5,133,314 A | * | 7/1992 | Langstroth .............. | F02B 75/32 123/197.1 |
| 5,163,341 A | * | 11/1992 | Murrish ................... | F16C 3/14 123/196 R |
| 5,199,318 A | | 4/1993 | Hudson | |
| 5,203,230 A | * | 4/1993 | Distelrath ................ | F16C 3/08 74/595 |
| 5,265,566 A | * | 11/1993 | Arnold ................... | F02F 11/007 123/197.4 |

(Continued)

FOREIGN PATENT DOCUMENTS

EP          0113320 A1    7/1984

OTHER PUBLICATIONS

Great Britain Patent Office, Great Britain Search Report for Great Britain Application No. 1517520.1, dated Mar. 9, 2016.

*Primary Examiner* — Long T Tran
(74) *Attorney, Agent, or Firm* — Lorenz & Kopf, LLP (57) ABSTRACT

A crankshaft for an internal combustion engine includes a shaft body having a body rotation axis, with at least one crank pin for coupling a connecting rod to the crankshaft. The crank pin is connected to the shaft body in an offset manner with respect to the body rotation axis by two crank arms. Each arm has an arm surface facing one to the other with the crank pin extending between the arm surfaces. At least one of the arm surfaces is provided with a protrusion extending from the arm surface and configured to avoid contact between the arm surface and the connecting rod.

9 Claims, 7 Drawing Sheets

(56) References Cited

U.S. PATENT DOCUMENTS

| | | | | |
|---|---|---|---|---|
| 7,827,684 | B2* | 11/2010 | Heimann | B21H 7/185 |
| | | | | 29/888.01 |
| 8,813,358 | B2* | 8/2014 | Ohnuma | B21J 5/02 |
| | | | | 29/6.01 |
| 2004/0025340 | A1* | 2/2004 | Kubota | F16C 9/045 |
| | | | | 29/888.09 |
| 2005/0205043 | A1* | 9/2005 | Schmidt | B27B 17/00 |
| | | | | 123/197.1 |
| 2005/0268879 | A1* | 12/2005 | Endoh | F16C 3/10 |
| | | | | 123/197.4 |
| 2006/0150405 | A1 | 7/2006 | Heimann et al. | |
| 2007/0051197 | A1* | 3/2007 | Yamamoto | F16C 3/08 |
| | | | | 74/596 |
| 2007/0143997 | A1* | 6/2007 | Behr | C21D 5/00 |
| | | | | 29/888.08 |
| 2014/0260787 | A1* | 9/2014 | Kumar | C21D 7/06 |
| | | | | 74/605 |
| 2015/0275960 | A1* | 10/2015 | Kamiya | F16C 3/08 |
| | | | | 74/596 |
| 2015/0321245 | A1* | 11/2015 | Tahira | B21K 1/08 |
| | | | | 74/595 |

\* cited by examiner

CRANKSHAFT FOR AN INTERNAL COMBUSTION ENGINE

CROSS-REFERENCE TO RELATED APPLICATION

This application claims priority to Great Britain Patent Application No. 1517520.1, filed Oct. 5, 2015, which is incorporated herein by reference in its entirety.

TECHNICAL FIELD

The present disclosure pertains to the motion transmission between a crankshaft of an internal combustion engine and a relevant connecting rod coupled to the crankshaft.

BACKGROUND

According to a conventional configuration of the internal combustion engine, a crankshaft is provided with one or more crank pins that are arranged offset with respect to the rotation axis of the crankshaft itself. As a result, when the crankshaft rotates, the crank pins are displaced along a circular trajectory.

Connecting rods are coupled to the crank pins to transform the rotation of the crankshaft into a linear reciprocating motion in a known manner, or, vice versa, to transform a linear reciprocating motion (e.g. the motion of a piston coupled to the connecting rod) to a rotation of the crankshaft. At the ends of the crank pin, there are generally two crank arms (one for each side), to drive the connecting rod keeping it in the correct axial position. Friction between the internal surface (i.e. the one coupled to the crank pin) of the crank arm and the connecting rod may damage the connecting rod itself by excessive wear.

In more detail, the crankshaft can be produced by forging. As known, at the end of the forging process, a thin portion of metal is left on the crankshaft where the two dies meet (known as forging parting line). In particular, a sharp or pointed portion (i.e. an edge) of metal is left on the crank arm at the crank pin. This sharp portion acts as a blade on the connecting rod, wearing its side faces out.

It is thus known to operate on the border of the internal surface (e.g. by chamfering or topping) to remove or cover such a sharp portion. These additional machining operations are expensive and time-consuming.

SUMMARY

The present disclosure reduces or avoids damage of the connecting rod because of the crank arm by providing a simple and cost saving solution that prevents the damaging of the connecting rod at the crank arm. According to an embodiment, a crankshaft for an internal combustion engine is provided with a shaft body having a body rotation axis, with at least one crank pin for coupling a connecting rod to the crankshaft. The crank pin is connected to the shaft body in an offset manner with respect to the body rotation axis, by two crank arms, each having an arm surface (also called oil collar) facing one to the other. The crank pin extends between the arm surfaces, and at least one of the arm surfaces is provided with a protrusion extending from the surface. In particular, the protrusion is configured to avoid contact between the arm surface and the connecting rod and to provide a precise and smooth surface to guide the connecting rod itself.

Thanks to the protrusion, the connecting rod, in operative condition, is arranged at a distance from the arm surface, and such a distance is at least equal to the thickness of the protrusion. Damage of the connecting rod is thus prevented, due to an effective configuration of the crank arm. In particular, even if the crank arm is provided with an edged section (e.g. the above mentioned forging parting line) at the crank pin, no damage is caused on the connecting rod during operation of the crankshaft.

According to an embodiment, the protrusion at least partially surrounds an end of the crank pin. Due to this, the protrusion can be easily arranged on the crank arm. Also, the protrusion can be provided with a great surface in a simple manner.

According to an embodiment, the protrusion is substantially annular, which has proven to be a simple and effective solution that does not require additional machining operations.

According to an embodiment, the protrusion has a thickness included between 0.2 and 0.8, preferably equal to 0.5 mm. In other words, the protrusion has a thickness of 0.5+/−0.3 mm. Protrusions having such a thickness allows to effectively separate the arm surface from the connecting rod during operation of the crankshaft.

According to an embodiment, at least part of the protrusion has a width, measured in radial direction with respect to the longitudinal axis of the crank pin, equal to 5 mm. This 5 mm radial width is dedicated to assure a proper guiding height for the connecting rod.

According to an embodiment, the crankshaft is forged. This provides a good compromise between cost effectiveness and precision.

According to an embodiment, the protrusion is in one piece with the crank arm. Due to this, the protrusion can be easily obtained. Also it can be easily provided with the required stiffness.

According to an embodiment, the crank arm is provided with a forging parting line at the crank pin. In particular, the forging parting line can be left on the crank arm without causing subsequent damage to the connecting rod.

According to an embodiment, the distance between the forging parting line and the protrusion is of at least 3 mm. The above mentioned distance is measured radially with respect to the longitudinal axis of the crank pin. This 3 mm distance spaces the parting line from the connecting rod taking into account the worst case forging tolerances. The higher are the forging tolerance the higher must be the distance of the parting line to be put apart.

An embodiment of the present disclosure further provides for an internal combustion engine including a crankshaft according to any of the preceding aspects and a connecting rod coupled to the crank pin of the crankshaft. In particular, the connecting rod is distanced from the arm surface of the crankshaft.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
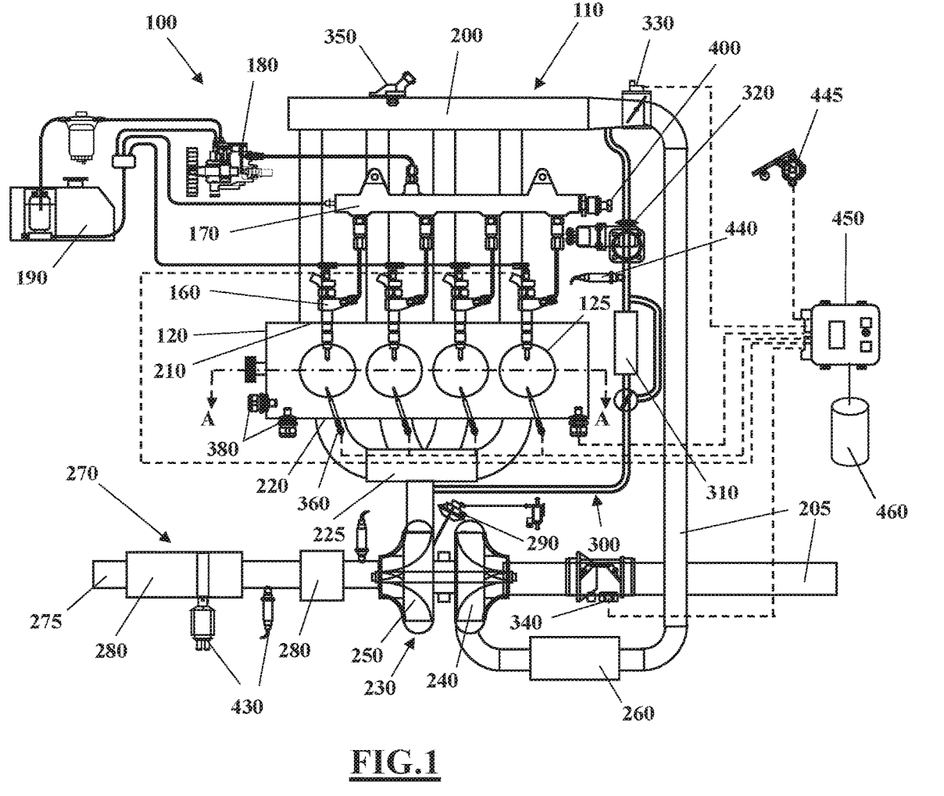
FIG. 1 shows an embodiment of an automotive system including an internal combustion engine in which a crankshaft according to an embodiment of the present disclosure can be used.
Figure 2:
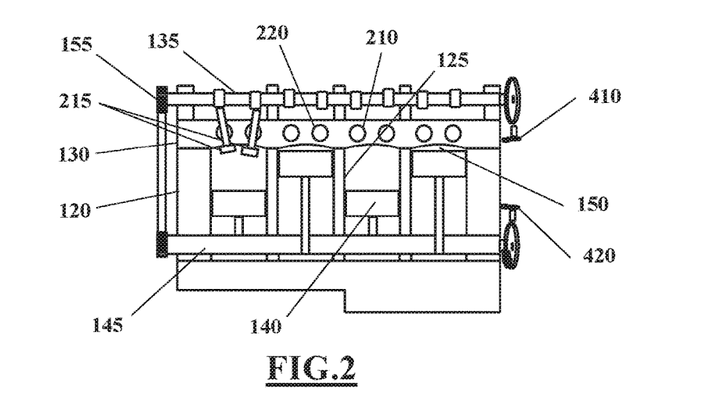
FIG. 2 is a cross-section according to the plane A-A of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by the camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided, Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters two and three way), oxidation catalysts, lean NOx traps, hydrocarbon adsorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel pump 180, fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system 460, or data carrier, and an interface bus. The CPU is configured to execute instructions stored as a program in the memory system, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices.

Instead of an ECU 450, the automotive system 100 may have a different type of processor to provide the electronic logic, e.g. an embedded controller, an onboard computer, or any processing module that might be deployed in the vehicle.

According to an embodiment of the present disclosure, as shown in FIGS. 3-9, a crankshaft 145 is provided with a shaft body 10 having a body rotation axis A. The crankshaft 145 is further provided with at least one crank pin 11 for coupling a connecting rod 20 (see FIGS. 7-9) to the crankshaft 145. In particular, the connecting rod 20 is typically provided with an opening (not shown) that, in operative condition, surrounds the crank pin 11.

Figure 3:
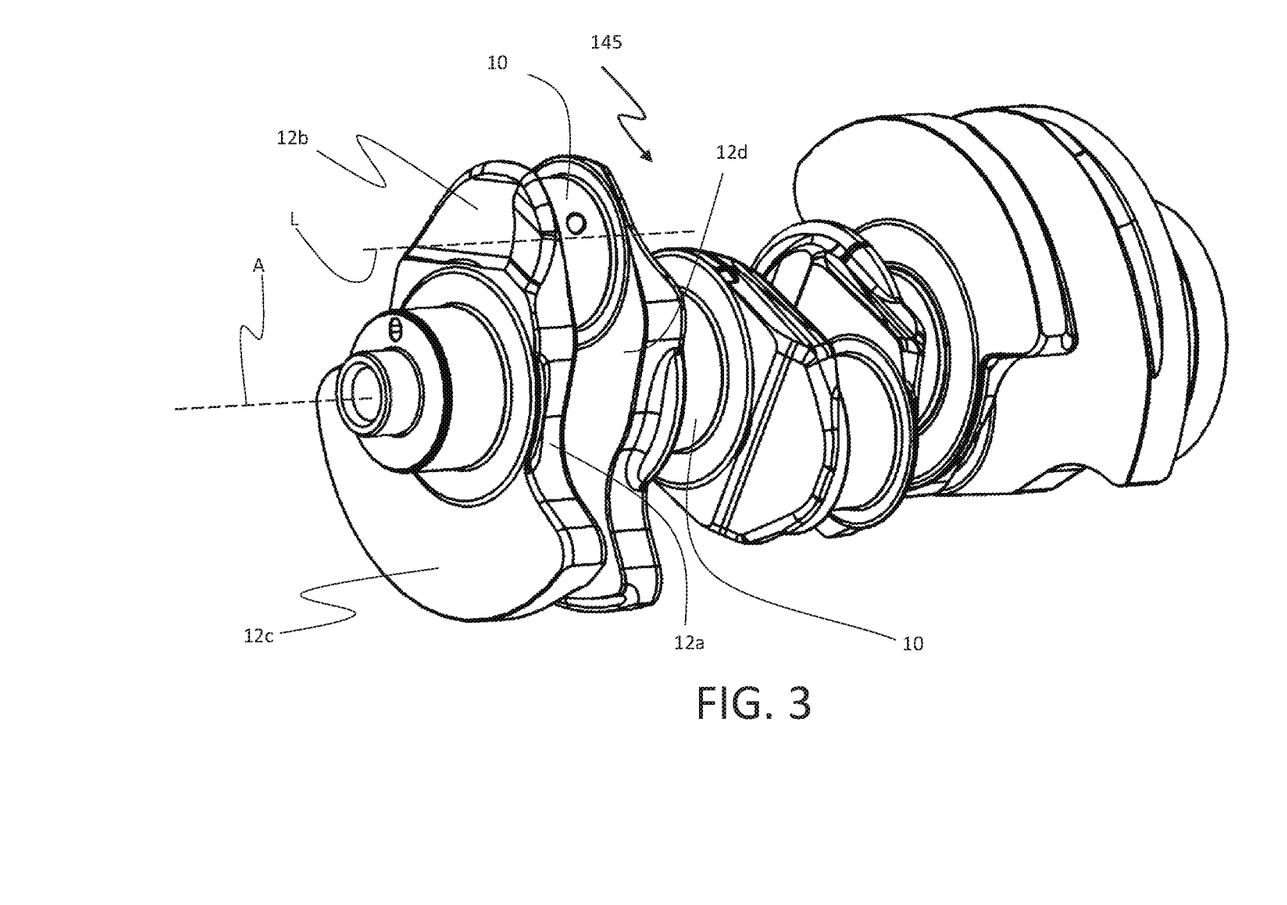
FIG. 3 is a perspective view of a crankshaft according to an embodiment of the present disclosure.
Figure 4:
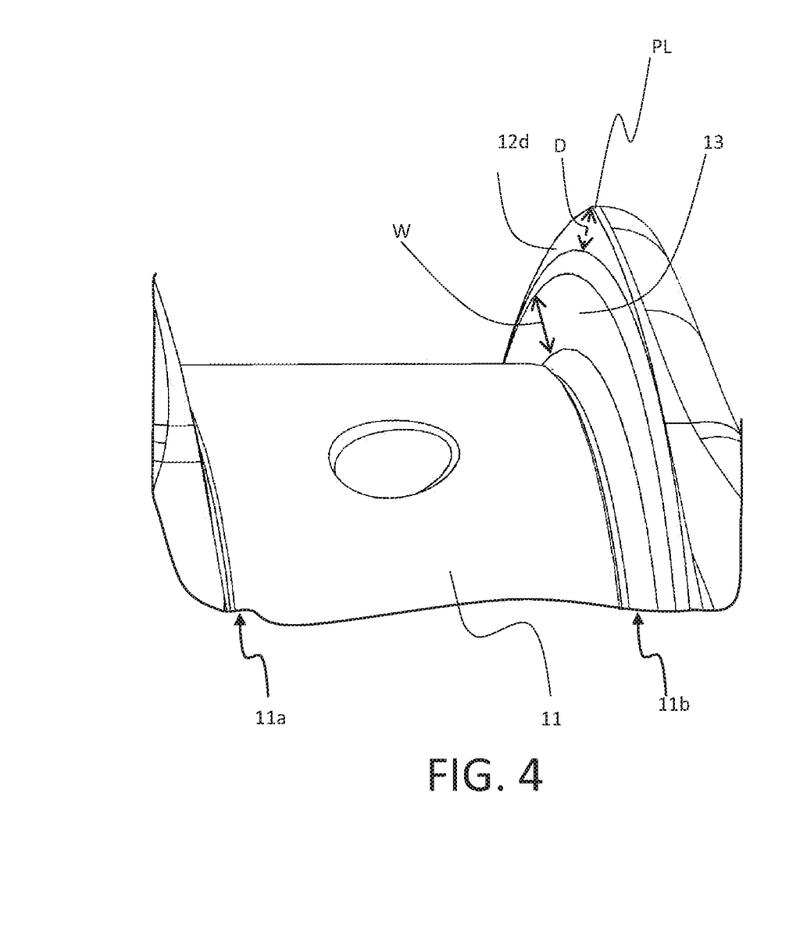
FIG. 4 is an enlarged perspective view of a crank pin of the crankshaft of FIG. 3.
Figure 5:
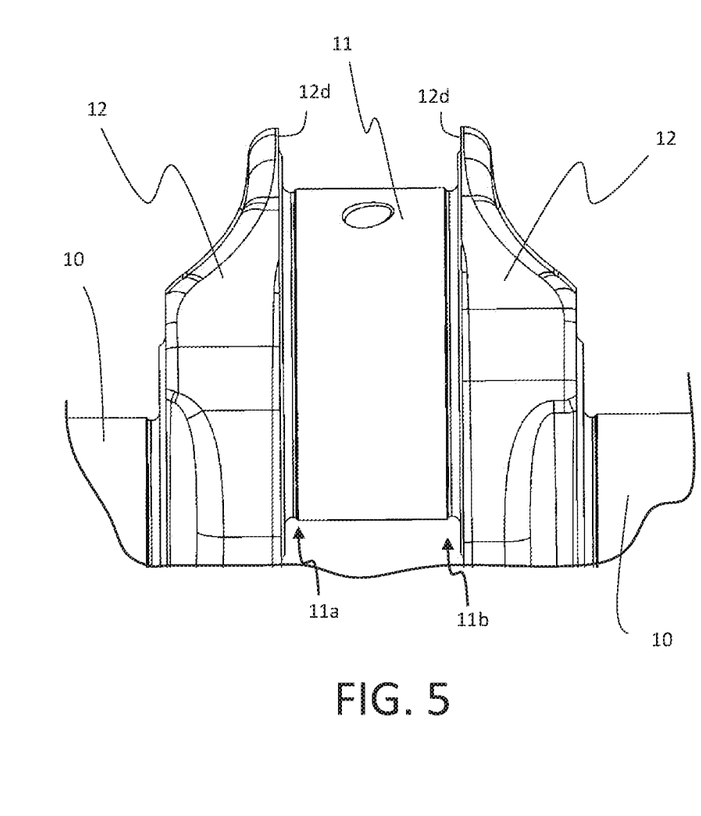
FIG. 5 is a frontal view of the crank pin of FIG. 4.

The crank pin 11 is arranged offset with respect to the body rotation axis A. In particular, the crank pin 11 is typically arranged at a distance from the body rotation axis A. The crank pin 11 is generally shaped substantially as a cylinder, having a longitudinal axis L parallel with respect to, and distanced from, the body rotation axis A. The crank pin 11 is connected to the crank body 10 by two crank arms 12. Typically, the two crank arms 12 are arranged at the two ends 11a, 11b of the crank pin 11 (i.e. one crank arm per end). The crank arms 12 are typically provided with a central portion 12a coupled to the shaft body 10.

A first end portion 12b of the crank arms 12 is provided with the crank pin 11. A second end portion 12c of the crank arms, opposite to the first end portion 12b, is typically enlarged to act as a counterweight to the forces transmitted between the crank pin 11 and the connecting rod 20.

The crank arms 12 are provided with an arm surface 12d. In particular, the arm surfaces 12d of the crank arms face one to the other. The crank pin 11 is placed between the two arms surfaces 12d. The arm surfaces 12d are typically flat. At least one of the arm surfaces 12d is provided with a protrusion 13, which extends from the arm surface 12d. According to an embodiment, both the arm surfaces 12d are provided with a protrusion 13.

Figure 8:
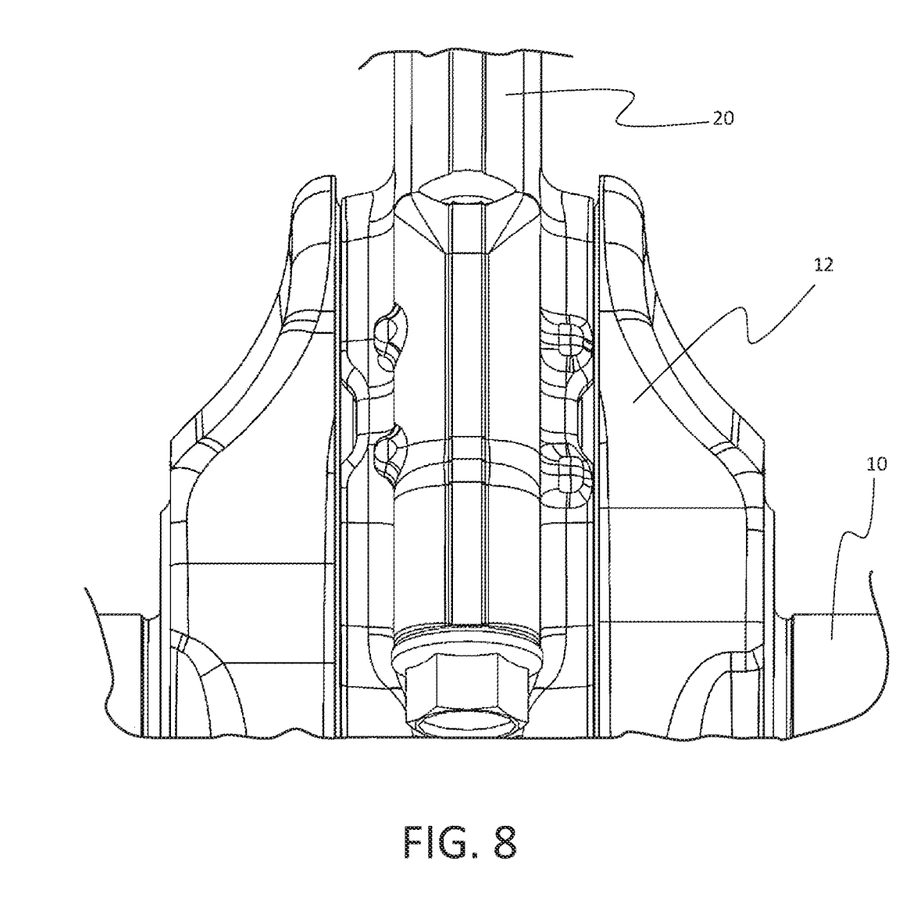
FIG. 8 is a frontal view as per FIG. 5, with a connecting rod coupled to the crank pin.
Figure 9:
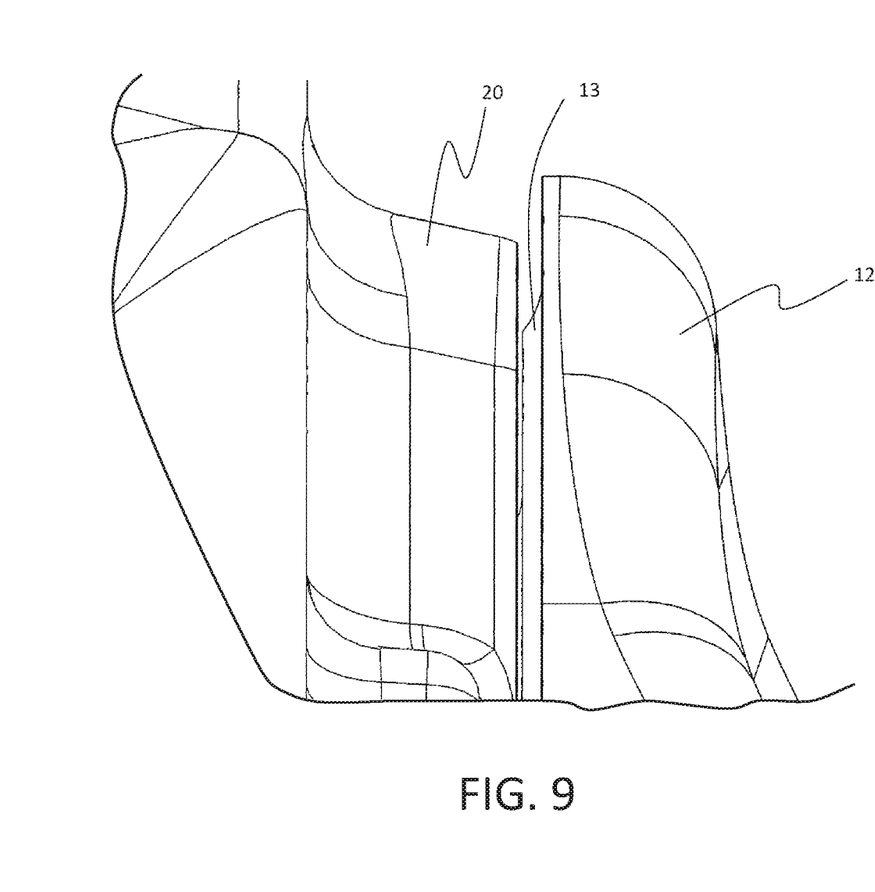
FIG. 9 is an enlarged detail of FIG. 8.

The protrusion 13 separates the relevant arm surface 12d from the connecting rod 20, as particularly shown in FIGS. 8 and 9. In particular, according to an embodiment, the thickness T of the protrusion 13 is at least 0.2 mm. In a preferred embodiment the thickness T of the protrusion 13 is included between 0.2 and 0.8 mm. A nominal value for the thickness T is equal to 0.5 mm. The thickness T is the dimension of the protrusion 13 measured along a direction that is parallel with respect to the body rotation axis A.

Figure 6:
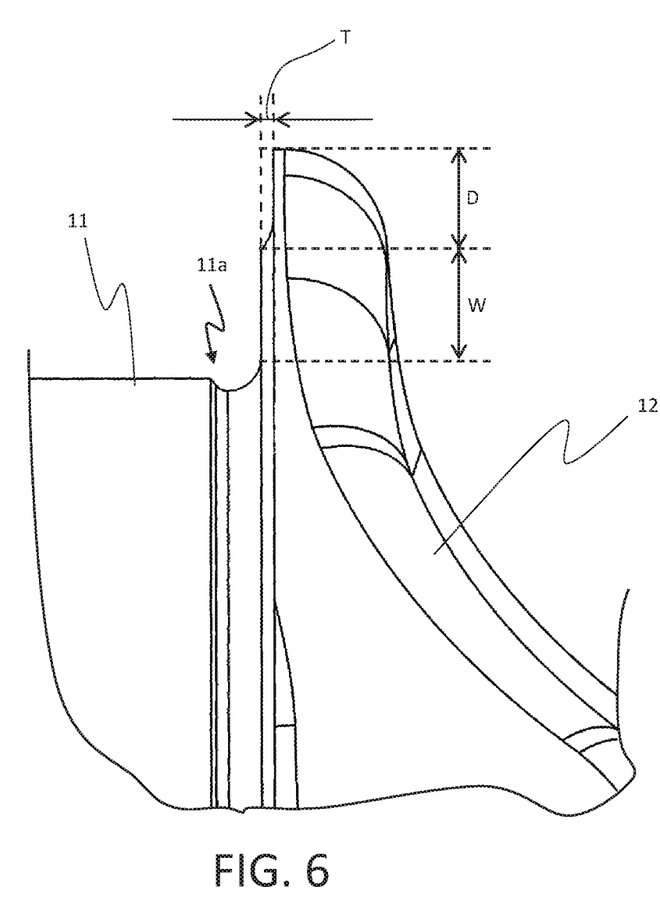
FIG. 6 is an enlarged detail of FIG. 5.
Figure 7:
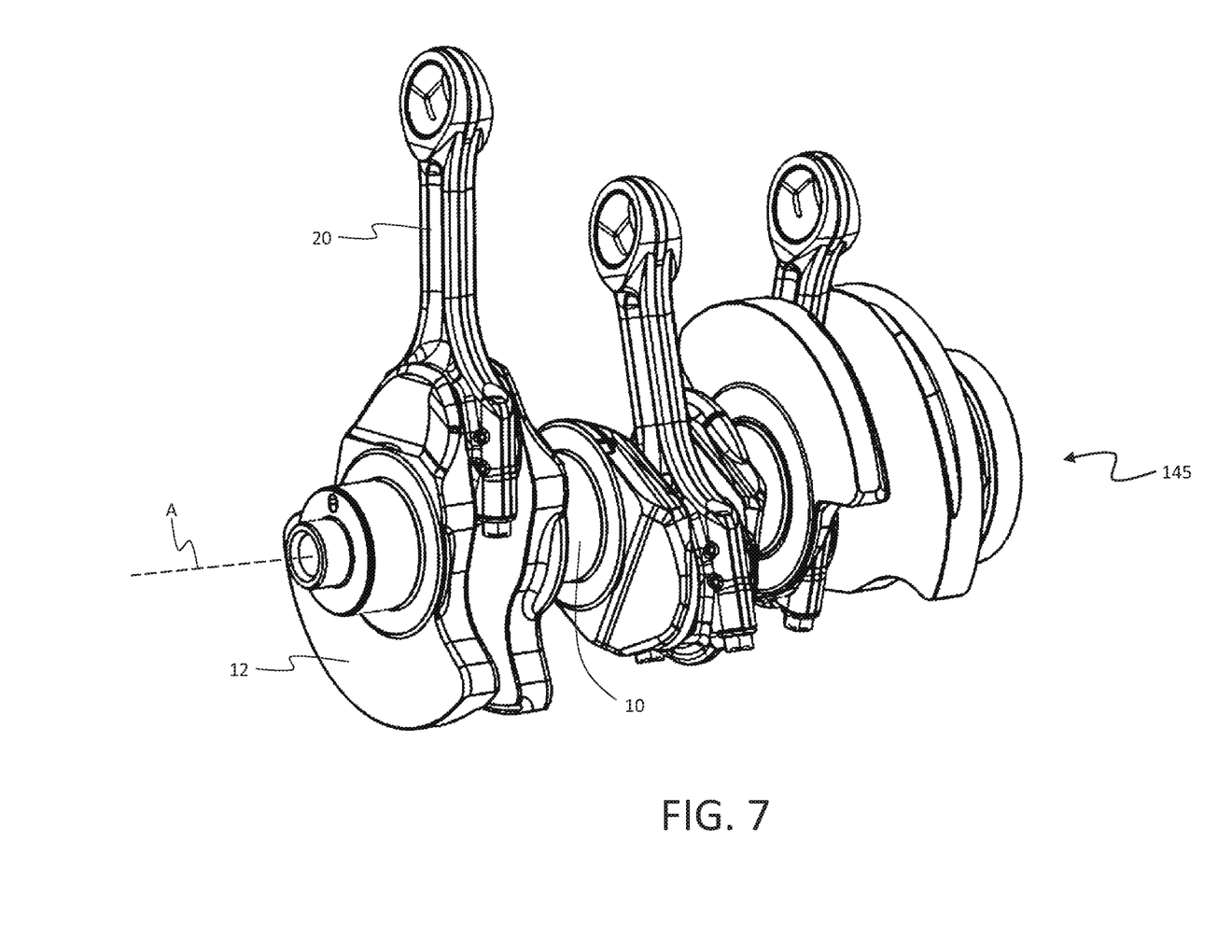
FIG. 7 is a perspective view of the crankshaft of FIG. 3, coupled to connecting rods.

According to an embodiment, at least part of the protrusion 13 has a width W of about 5 mm. The width W is measured along a direction that is radial with respect to the longitudinal axis L of the crank pin 11. In the shown embodiment, the protrusion 13 has a constant width W. In particular, the protrusion 13 has annular configuration. Oil (or a similar lubricant) is generally interposed between the connecting rod 20 and the crank pin 11. Preferably, as per the shown embodiment, the protrusion 13 completely surrounds an end 11a, 11b of the crank pin 11.

Different configurations are possible. As an example, in a different embodiment the protrusion has a width that is not constant. Furthermore, in different embodiments, the protrusion may only partially surround the crank pin. As an example, the protrusion can be configured as an annulus of less than 360 degrees. Also, more than one protrusion can be present. As an example two partially annular protrusions (e.g. each extending for 120 degrees) can be used, arranged opposite one to the other with respect to the crank pin 11.

Moreover, the protrusion(s), in different embodiments, may be not annular. As an example, four protrusions configured as parallelepipeds protruding from the arms surface 12d can be used, placed laterally to the crank pin 11, distanced 90 degrees one to the other with respect to the body rotation axis A. In a further different embodiment, the protrusion can be configured as a rectangular (or polygonal) frame, etc. In general, the protrusion 13 avoid contact between the relevant arm surface 12d (i.e. the arm surface 12d from which it extends) and the connecting rod 20, as shown in FIGS. 8 and 9.

According to an embodiment, the protrusion 13 is made in one piece with the arm surface 12d, As an example, the protrusion 13 can be directly obtained during the OD milling (outer diameter milling) of the crankshaft 145. Due to the protrusion 13, the border of the arm surface 12d does not contact the connecting rod 20.

According to an embodiment, the crankshaft 145 can be produced by forging. As a result, as before discussed, a forging parting line can be left on the arm surface 12d, without the need of removing or covering it. In other words, in the present embodiments, there is no need of further machining the arm surface 12d. As a result, the crank arm 12d provided with a protrusion 13 can be provided with the forging parting line PL, i.e. with an edge, without affecting the operation of the connecting rod 20.

Preferably, the parting line is apart from (i.e. it is distanced from) the protrusion 13 by a distance D, measured in radial direction with respect to the longitudinal axis L of the crank pin 11, from the border of the protrusion 13 to the border of the forging parting line PL. This radial distance has to be determined according to the forging tolerances: 3 mm distance represents a good solution. However, the higher are the forging tolerance, the higher must be the distance D value to make sure that the parting line PL will be always put apart from the protrusion 13. As a result, the arm surface 12 does not damage the connecting rod 20 during operation.

During use, the connecting rod 20 is coupled in a known manner to the crank pin 11 of the crankshaft 145. The presence of the protrusion 13 prevents contact between the connecting rod and the arm surface 12d. In particular, the connecting rod 20 is arranged at a certain distance (measured parallel with respect to the longitudinal axis L of the crank pin 11) from the arm surface 12d to leave enough clearance for the lubricant (typically oil) which is generally interposed between the connecting rod 20 and the crank pin 11.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A forged crankshaft for an internal combustion engine comprising:
   a shaft body having a body rotation axis;
   a crank pin configured to couple the crankshaft to a connecting rod; and
   two crank arms connecting the crank pin to the shaft body in an offset manner with respect to the body rotation axis, each crank arm having an arm surface facing one to the other, wherein the crank pin extends between the arm surfaces, and wherein at least one of the arm surfaces comprises a forging parting line at the crank pin and a protrusion extending from the arm surface to prevent contact between the arm surface and the connecting rod, wherein a distance between the forging parting line and the protrusion is at least 3 mm.

2. The crankshaft according to claim 1, wherein the protrusion at least partially surrounds an end of the crank pin.

3. The crankshaft according to claim 2, wherein the protrusion is substantially annular.

4. The crankshaft according to claim 1, wherein the protrusion is substantially annular.

5. The crankshaft according to claim 1, wherein the protrusion has a thickness in a range between 0.2 mm and 0.8 mm.

6. The crankshaft according to claim 5, wherein the protrusion has a thickness equal to 0.5 mm.

7. The crankshaft according to claim 1, wherein at least portion of the protrusion has a width measured in radial direction with respect to a longitudinal axis of the crank pin of about 5 mm.

8. The crankshaft according to claim 1, wherein the protrusion is in one piece with the crank arm.

9. An internal combustion engine comprising:
a forged crankshaft including a shaft body having a body rotation axis, a crank pin, and two crank arms connecting the crank pin to the shaft body in an offset manner with respect to the body rotation axis, each crank arm having an arm surface facing one to the other, wherein the crank pin extends between the arm surfaces, and wherein at least one of the arm surfaces comprises a forging parting line at the crank pin and a protrusion extending from the arm surface, wherein a distance between the forging parting line and the protrusion is at least 3 mm; and
a connecting rod coupled to the crank pin and spaced from the arm surface by the protrusion which prevents contact between the arm surface and the connecting rod.

* * * * *